United States Patent [19]
Gardner

[11] Patent Number: 5,455,846
[45] Date of Patent: Oct. 3, 1995

[54] DETECTION OF A DIGITALLY MODULATED SIGNAL USING BINARY LINE ENHANCEMENT

[75] Inventor: Robert W. Gardner, San Jose, Calif.

[73] Assignee: Signal Science, Inc., Santa Clara, Calif.

[21] Appl. No.: 153,447

[22] Filed: Nov. 17, 1993

[51] Int. Cl.$^6$ .............................. H04L 27/06; H03D 1/00; G06K 9/46
[52] U.S. Cl. ............................................ 375/340; 382/202
[58] Field of Search .......................... 370/105.1; 375/94, 375/340; 382/24

[56] References Cited

U.S. PATENT DOCUMENTS

| | | | |
|---|---|---|---|
| 4,003,024 | 1/1977 | Riganati et al. | 382/49 |
| 4,625,330 | 11/1986 | Higgins | 382/50 |

OTHER PUBLICATIONS

Torrieri, Don J. *Principles of Military Communication Systems*, Artech House, Inc., 1981. Chapter 4.
Gardner, William A. *Statistical Spectral Analysis A Non-probabilistic Theory*, Prentice Hall, 1988. Chapter 14.

*Primary Examiner*—Stephen Chin
*Assistant Examiner*—Jeffrey W. Gluck
*Attorney, Agent, or Firm*—Skjerven, Morrill, MacPherson, Franklin & Friel; Edward C. Kwok

[57] ABSTRACT

Detection of a digitally modulated radio signal whose underlying data contain repetition structures is achieved by generating a binary spectrum from the frequency domain spectral amplitudes. The binary spectrum of the signal can be rastered at the signal's framing rate or other periodicity to create a two dimensional matrix with the set periodic bits falling along column of the matrix. Application of non-linear logical filtering operations removes speckle caused by aperiodic bits while maintaining the run of aligned periodic bits along the column of the matrix. To automate the line detection process, statistical values and measured line lengths in the binary matrix are used to adjust processing parameter values.

9 Claims, 11 Drawing Sheets

DETECTION OF A DIGITALLY MODULATED SIGNAL USING BINARY LINE ENHANCEMENT

BACKGROUND OF THE INVENTION

1. Field of the Invention

This invention relates to digital signal processing. In particular, this invention relates to a system for detecting, in a channel of substantial signal interference, a digitally modulated signal with repetitively structured data.

2. Discussion of the Related Art

A time division multiplexed (TDM) signal has a characteristic repetitive structure in the modulated data resulting in part from markers which identify the boundaries of data words and frames. The structural organization of the TDM signal permits the signal to carry data combined from different sources ("tributary data streams") to be transmitted as a single composite signal. Periodicity in a TDM signal can also arise from the inherent nature of time-multiplexing tributary data streams. If a tributary data stream is self-correlated, the resulting composite signal is periodically correlated.

In the prior art, digitally modulated signals are typically detected by examining a spectrum ("detector spectrum") of an input signal to determine the signal's symbol rate, frame rate, word rate, and center frequency. A typical detection method filters the input signal to eliminate noise, applies a quadratic operator to the filtered signal, and then computes the detector spectrum from the quadratic operator's signal output. The detector spectrum is then analyzed for peaks at specific frequency locations.

In another class of methods, a digitally modulated signal is detected using "cyclostationary signal processing" techniques. In these methods, a cyclic correlation, a cyclic spectrum, or both, are computed. The computed cyclic correlation value, or the cyclic spectrum, is analyzed for peaks corresponding to the symbol rate, the center frequency, the frame rate, and the word rate of the signal.

The detector spectrum resulting from any of the above methods can yield an erroneous detection result when interference is present. Such an erroneous detection results from the quadratic operations, which are inherent in these methods, generating spurious peaks from the cross products of interfering signals, thereby obliterating from the detector spectrum the peaks of the signal to be detected. In fact, peaks resulting from signal interference can dominate the detector spectrum.

Several approaches to improve detection of structured signals from a detector spectrum have been tried in the prior art. For example, one method "rasters" the detector spectrum at the expected frame rate and searches for an alignment of peaks to confirm periodicity at the frame rate. Rastering divides the spectrum into sections of equal frequency intervals, e.g. a frequency interval corresponding to an integer multiple of the frame rate, and aligns these equal interval sections of the spectrum with each other. However, the prior art approaches are successful only when the interfering signals are weak. When the interfering signals are strong, the numerous peaks present in the rastered spectrum render a determination of whether the spectral peaks are aligned difficult. To improve detection of a peak alignment, the operator varies a threshold and displays only the peak amplitudes in the spectrum exceeding the threshold. However, the proper selection of an appropriate threshold is difficult because the relative power levels between the signal and the interfering signal or signals are unknown. Thus, such an approach fails to detect the signal when the threshold is incorrectly set.

Other approaches to improve signal detection include using filters on the input signal. A band pass filter can be used to attenuate interference from signals located in frequencies outside the pass band. Also, an adaptive line-canceling filter or a notch filter can be used to attenuate narrow-band interference collocated in the frequencies of the signal to be detected. However, difficulties exist in attenuating wide-band interfering signals collocated in the frequencies of the signal to be detected.

Even without the presence of an overriding signal interference, human intervention is still required to establish a signal detection. The required human intervention prevents automated spectrum monitoring.

SUMMARY OF THE INVENTION

The present invention provides a method for detecting a periodic signal. This method for detecting a periodic signal, which can be easily automated, is based upon creating from electromagnetic signals received a detector spectrum comprising a plurality of frequency bins. Each of these frequency bins spans a predetermined frequency resolution. From the sample values of the frequency bins, a peak selection binary (PSB) spectrum is created by assigning, for each frequency bin in the PSB spectrum, a logic value '1' when a "peak criterion" is satisfied in a corresponding frequency bin of the detector spectrum. The peak criterion is satisfied when a sample in the corresponding frequency bin of the detector spectrum is greater in magnitude than samples of neighboring frequency bins of the detector spectrum within a predetermined number of frequency bins. The number of neighboring frequency bins examined is specified by the value of a peak detection parameter. If the peak criterion is not satisfied, the frequency bin of the PSB spectrum is assigned a logic value '0'. The periodic signal is then detected from the PSB spectrum by examining the frequency bins of the PSB spectrum having the logic value '1'.

In one embodiment, the periodic signal is detected by creating a rate line raster (RLR) matrix from the PSB spectrum. The RLR matrix is created by rastering the PSB spectrum at a framing frequency interval. The periodic signal is then detected by analyzing the RLR matrix for vertically neighboring logic values of '1's. In this embodiment, if a periodic signal's framing frequency is an integer multiple of the frequency resolution, the periodic signal causes the neighboring '1' logic values of the RLR matrix to form a vertical line. Otherwise, a staggered line is formed.

In accordance with one aspect of the present invention, a filter for detecting the periodic signal identifies a vertical line in the RLR matrix using a vertical line enhanced (VLE) matrix. Alternatively, a filter for detecting the periodic signal identifies a sloping or staggered line in the RLR matrix using a sloped line enhanced (SLE) matrix.

The present invention allows automatic monitoring of the PSB spectrum for signal detection in an environment of heavy signal interference, thereby overcoming the prior art requirement for human intervention in the signal detection process.

The present invention also provides adaptive adjustment of detection parameters to allow maximum signal detection performance in the presence of substantial signal interference.

Because the present invention provides a method which detects a periodic signal by detecting straight or curved lines in a two dimensional array, the method can be used in image processing applications. Specific applications include edge detection, speckle removal, line detection and skew removal. The method is directly applicable to binary images. Application to gray-scale or color images would first require reducing the image representation to binary values through thresholding or other methods.

BRIEF DESCRIPTION OF THE DRAWINGS

FIG. 9a shows graphically a procedure for automatically updating parameters used in the creation of the PSB spectrum, the VLE or the SLE matrix.

FIG. 9b shows graphically a procedure for automatically determining whether a signal is detected, based upon the values of performance parameters computed in the procedure of FIG. 9a.

DETAILED DESCRIPTION OF THE PREFERRED EMBODIMENTS

The present invention detects a repetitive structure in a composite signal by identifying a line in a binary matrix constructed from a spectrum of the composite signal. An embodiment of the present invention is provided in a Self Adjusting Binary Line Enhancer ("SABLE") system described below.

Since the SABLE system operates on discrete signal samples, the input signal is sampled at fixed intervals, and a spectrum ("detector spectrum") is computed. Some examples of suitable detector spectra are: (a) the amplitude spectrum of the signal; (b) the symbol rate detector spectrum; (c) the center frequency detector spectrum (e.g. in a phase-shift keyed modulated signal); (d) the cyclic spectrum; (f) the cyclic autocorrelation; and (g) a higher order spectrum. These spectra are known to those of ordinary skill in the art. Discussions of these spectra may be found in the following texts: (a) Torrieri, Don J., *Principles of Military Communication Systems*, Artech House, Inc. (1981), at Chapter 4; and (b) Gardner, William A. Statistical Spectral Analysis: A Nonprobablistic Theory, Prentice Hall (1988), at Chapter 14.

Figure 1:
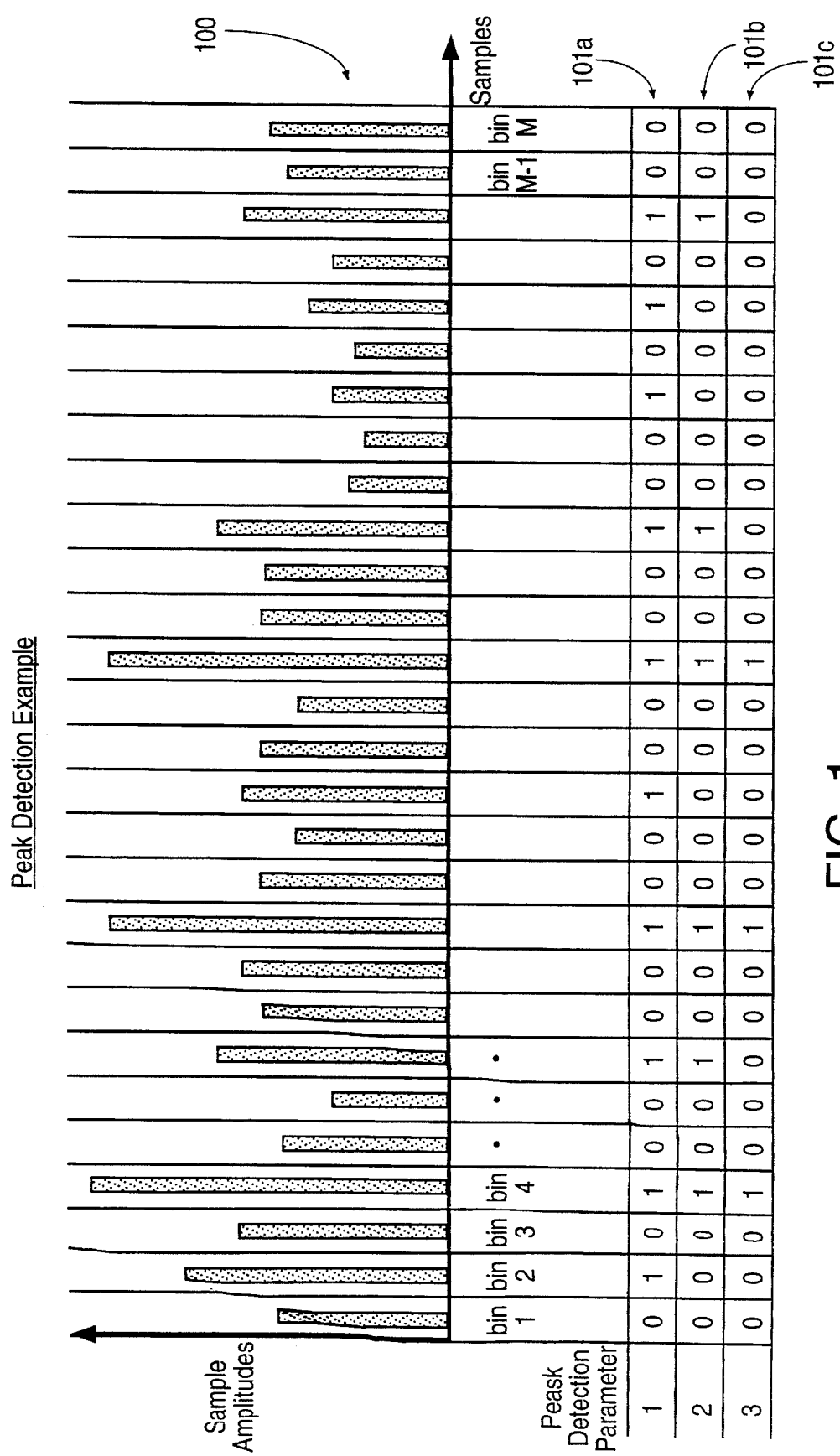
FIG. 1 shows the transformation of an input spectrum 100 with m frequency bins to "peak selection binary" (PSB) spectra 101a, 101b and 101c, corresponding to peak detection parameters n=1, 2, and 3, in accordance with the present invention.

Based on the discrete detector spectrum, the SABLE system creates a peak selection binary ("PSB") spectrum by comparing, in the discrete detector spectrum, each sample with the samples of its neighboring frequency bins. This process of creating a PSB spectrum is illustrated in FIG. 1. FIG. 1 shows the creation of PSB spectra 101a, 101b and 101c from an input detector spectrum 100 with m frequency bins labelled respectively from 1 to m.

Spectra 101a, 101b and 101c are respectively the PSB spectrum generated in accordance with three values of a "peak detection parameter" n. The value of the peak detection parameter n represents the number of frequency bins considered in creating the PSB spectrum. In the simplest case, corresponding to PSB spectrum 101a, the peak detection parameter n is set to one, indicating that only one frequency bin on each side of a sample is considered. In this case, when a sample is larger than both samples in the two neighboring frequency bins, the sample's frequency bin in the PSB spectrum is assigned a binary bit value, or logic value, of '1'. Otherwise, the sample's frequency bin in the PSB spectrum is assigned a binary bit value of '0'. For example, in spectrum 101a, the sample of input spectrum 100 at frequency bin 4 is larger than both the samples in frequency bins 3 and 5, hence the value in the corresponding frequency bin 4 of the PSB spectrum 101a is assigned the value '1'. By contrast, since the sample in frequency bin 3 of the input spectrum is smaller than the sample in frequency bin 4, the corresponding bin 3 of PSK spectrum 101a is assigned the value '0'. All the other frequency bins of spectrum 101a are accordingly assigned.

Further peak discrimination can be achieved by increasing the peak detection parameter. Under a higher value of the peak detection parameter, say n=N, a sample in a PSB spectrum is assigned a value of '1' only when, in the discrete detector spectrum, the corresponding sample is greater than all the samples in the N frequency bins on each side. Thus, in spectrum 101b, which corresponds to a value of 2 in the peak detection parameter n, the sample in frequency bin 2 is assigned a '0'. A higher value in the peak detection parameter n reduces the number of peaks detected, since only peaks each greater than its 2n frequency bin neighbors would be assigned the value of '1'. Thus, in spectrum 101c, only three peaks are assigned a bit value of '1'.

Figure 2:
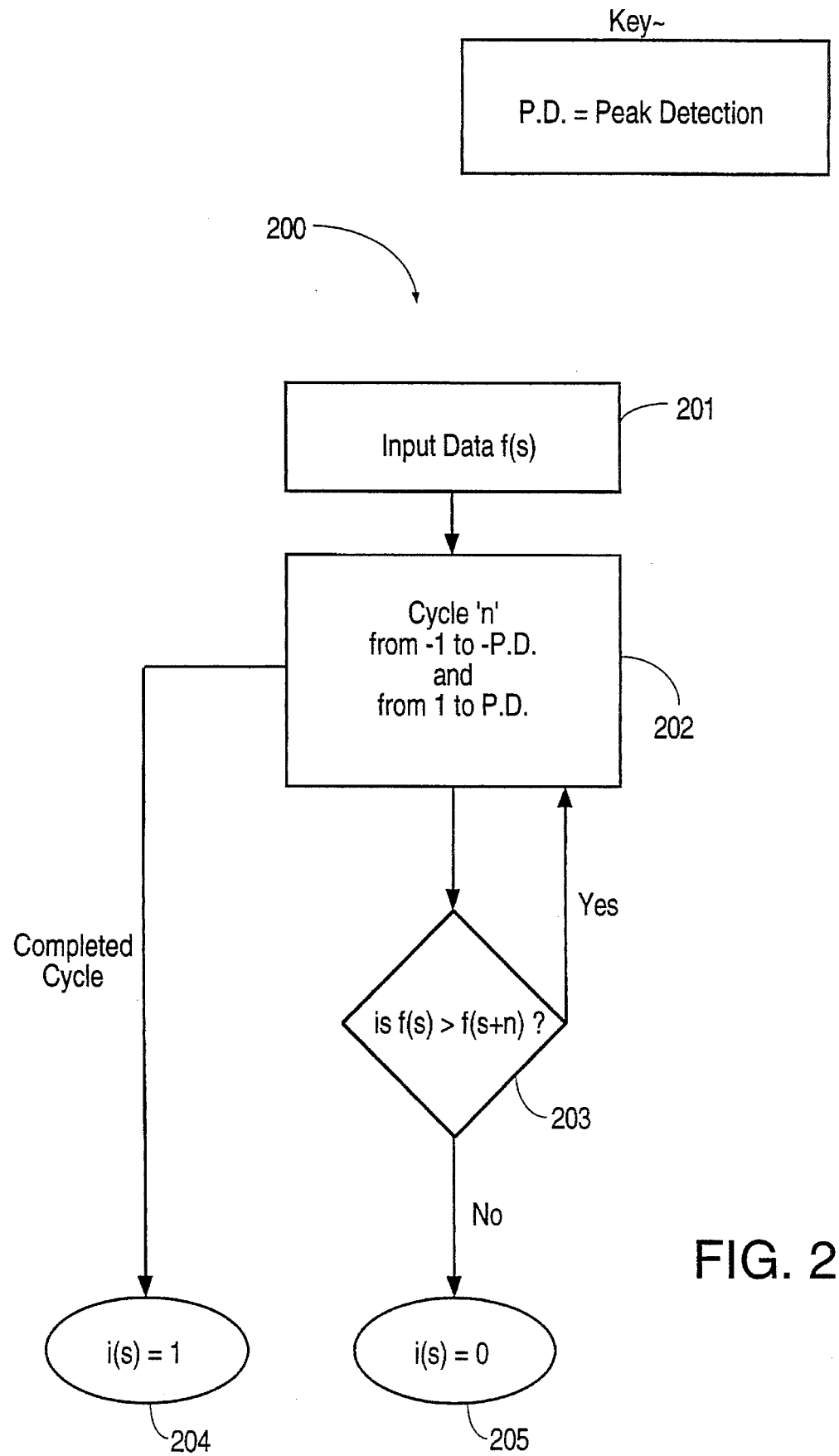
FIG. 2 is a flow diagram 200 of one implementation of automatic spectral peak detection.

FIG. 2 is a flow diagram of one implementation of the peak selection algorithm. At step 201, the detector spectrum is created. Step 202 represents a control step which cycles through a given sample's 2n neighboring samples to determine whether the given spectral sample is greater than each of the neighboring samples (step 203). As mentioned above, the value of the peak detection parameter n determines the number of neighboring samples to examine. The output value of step 202 is assigned either a '0', if any neighboring sample is greater than the given sample (step 205). Otherwise, the output value is assigned a '1', if the given sample is greater than all its neighboring samples.

The PSB spectrum has several advantages. First, assigning a binary amplitude of '1' to only selected peaks assigns equal weights to both signal peaks and peaks resulting from strong signal interference, regardless of their individual magnitudes. Further, the PSB spectrum can be monitored automatically by a high-speed bit processor. In this embodiment, an array of processors can be used for broad spectrum monitoring or for detecting multiple signals in parallel.

The PSB spectrum can be rastered to create a "rate line raster" (RLR) matrix, which is a two-dimensional array for aligning periodic samples of the PSB spectrum. The framing frequency and the frequency resolution (i.e. the frequency range covered by the frequency bin) together define the number of spectral samples (i.e. the number of frequency bins) in each row of the RLR matrix. The following equation summarizes the relationship between the framing frequency and the number of spectral samples:

$$\text{number of spectral samples per row} = \frac{\text{framing frequency}}{\text{frequency resolution}}$$

Figure 3:
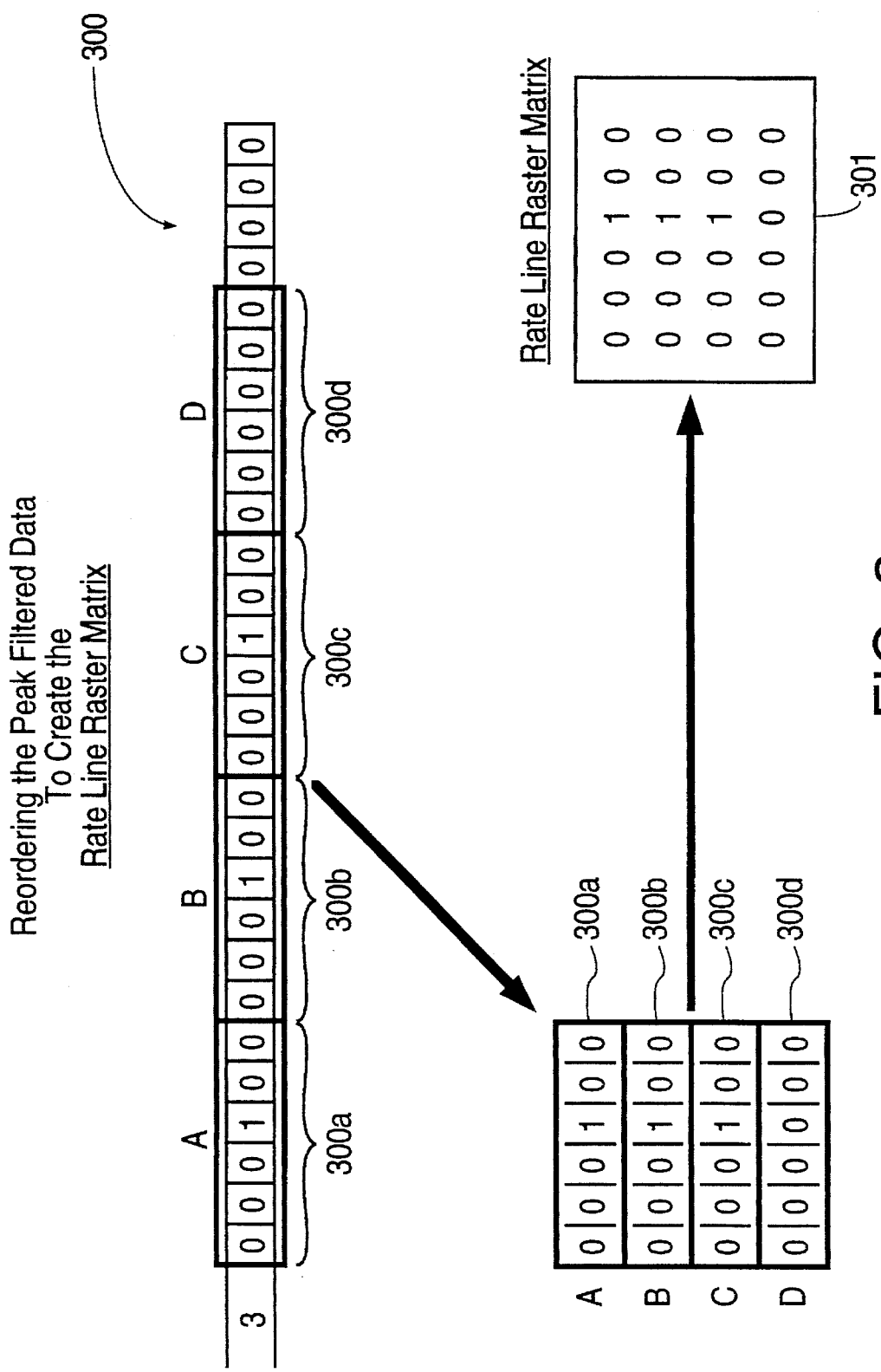
FIG. 3 shows reordering of a PSB spectrum 300 to create a "rate line raster" (RLR) matrix 301, which can be used to detect periodic structure in a detected signal, in accordance with the present invention.

FIG. 3 shows the process of creating an RLR matrix 301 from a PSB spectrum 300. As shown in FIG. 3, to create RLR matrix 301, spectrum 300 is divided, beginning at zero frequency, into spectral frames 300a, 300b, 300c and 300d. In this example, each spectral frame spans the range of the framing frequency. The PSB spectrum is then rastered by stacking the spectral frames of spectrum 300 vertically in order, as shown in FIG. 3. This procedure is repeated until all spectral frames in PSB spectrum 300 are assigned a position in RLR matrix 301.

As shown, the framing frequency in FIG. 3 is an integer multiple of the frequency resolution. In general, however, the framing frequency is not an integer multiple of the frequency resolution. Thus, the number of spectral samples in each row of the RLR matrix must vary to achieve an average number of spectral samples equaling the framing frequency divided by the frequency resolution. Since the positions of corresponding frequency bins vary slightly between rows in the RLR matrix, the spectral peaks resulting from a periodic signal may not exactly align in an RLR matrix. Rather, the logic '1' bits of such a periodic signal create a staggered line. In FIG. 3, a vertical string of 1's is found in RLR matrix 301, indicating the detection of spectral peaks separated by integral multiples of the framing frequency.

Figure 4:
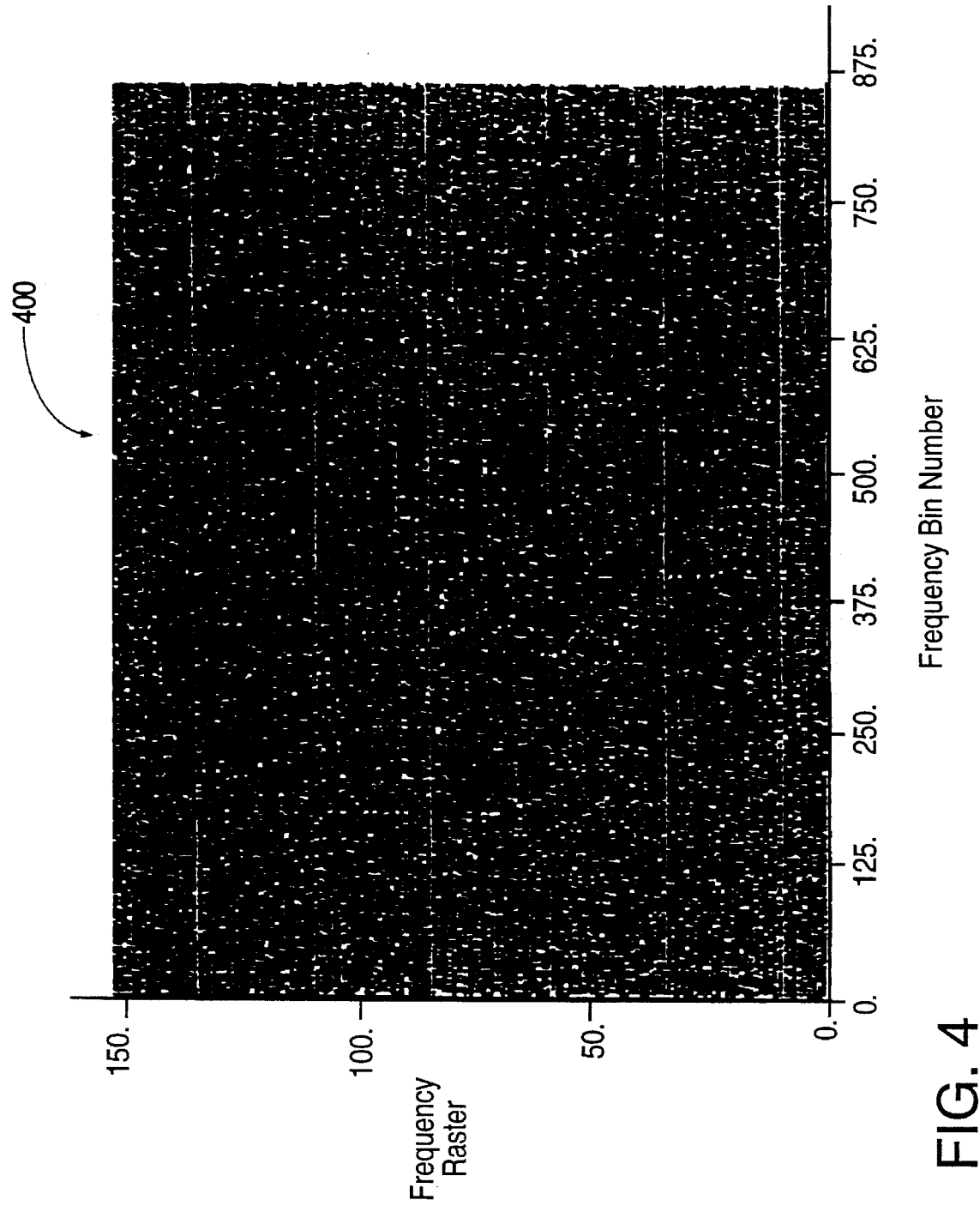
FIG. 4 shows an RLR matrix 400 obtained using a value of one for the peak detection parameter, and encoding the resulting '1' and '0' logic values by black and white pixels respectively.

If the value of the peak detection parameter is set too low, the aperiodic portion of the input signal causes random peaks in the PSB spectrum, thereby "speckling" the RLR matrix. Conversely, if the peak detection parameter is set too high, the periodic signal peaks resulting from the framing frequency may inadvertently be eliminated, resulting in an RLR matrix of dominant interference peaks. FIG. 4 shows an RLR matrix 400 obtained by setting the peak detection parameter to one. In FIG. 4, to help visualize RLR matrix 400, instead of using the logic values '0' and '1', a white pixel encodes a '0' and a black pixel encodes a '1'.

The RLR matrix provides a means for automatically detecting a periodic signal, by recognizing that, when the framing frequency is an integer multiple of the frequency resolution, the periodic signal would appear in an RLR matrix as a vertical line, and when the framing frequency is not an integer multiple of the frequency resolution, the periodic signal would appear in the RLR matrix as a staggered line. The present invention provides automated methods for detecting such a periodic signal using "vertical line enhanced" (VLE) and "sloping line enhanced" (SLE) matrices, which are developed from the RLR matrix.

Figure 5:
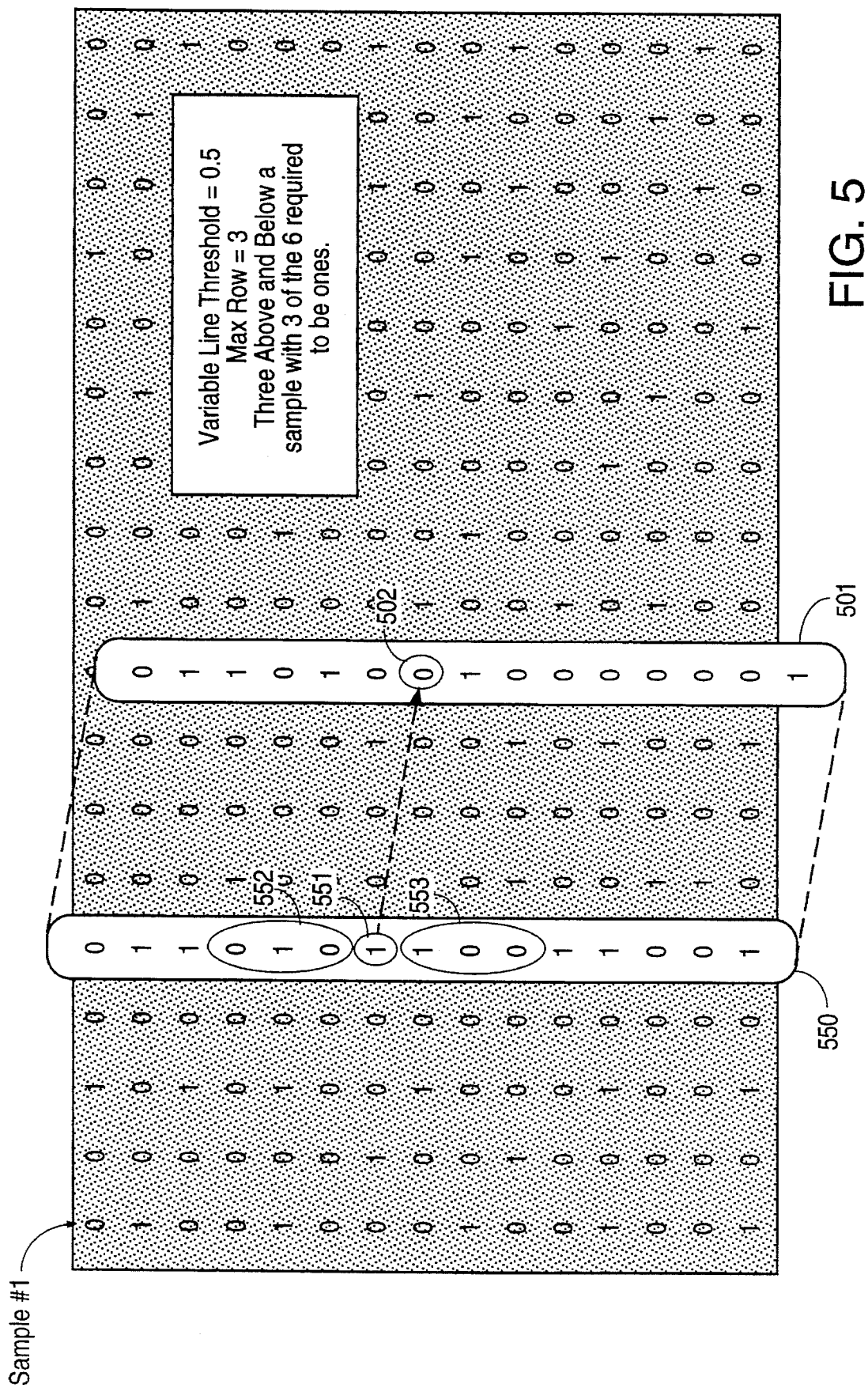
FIG. 5 illustrates the derivation of a column 501 in a "vertical line enhanced" (VLE) matrix from a column 550 of an RLR matrix.

A VLE matrix, which has the same dimensions as an RLR matrix, is created by scanning an RLR matrix for alignments of 1's. FIG. 5 illustrates the derivation of a column 501 in a VLE matrix from a column 550 of RLR matrix 500. As shown in FIG. 5, each element in column 501 of the VLE matrix is created by scanning vertically a predetermined number of rows above and below the corresponding element in column 550 of RLR matrix 500. For a given element having a value '1' in column 550, if the fraction of 1's over the predetermined number of rows (i.e. the value of a "max row" parameter) above and below the element exceeds a predetermined threshold (the value of a "line threshold" parameter), the corresponding element in column 501 is set to a '1'. Otherwise, the corresponding element in column 501 is set to a '0'. For example, in FIG. 5, the element 502 in column 501 is given a value of '0' because the fraction of '1's in groups 552 and 553 above and below corresponding element 551 (which is a logic '1') of RLR matrix 500 does not exceed the line threshold parameter value of 0.5. In this instance, groups 552 and 553 each have three elements, corresponding to a max row parameter value of 3. In the VLE matrix, a periodic signal is detected when a line of sufficient extent formed by 1's in the VLE matrix is detected. Such a line is detected when the number of '1's in the line exceeds the value of a "line detection threshold" parameter.

Figure 6:
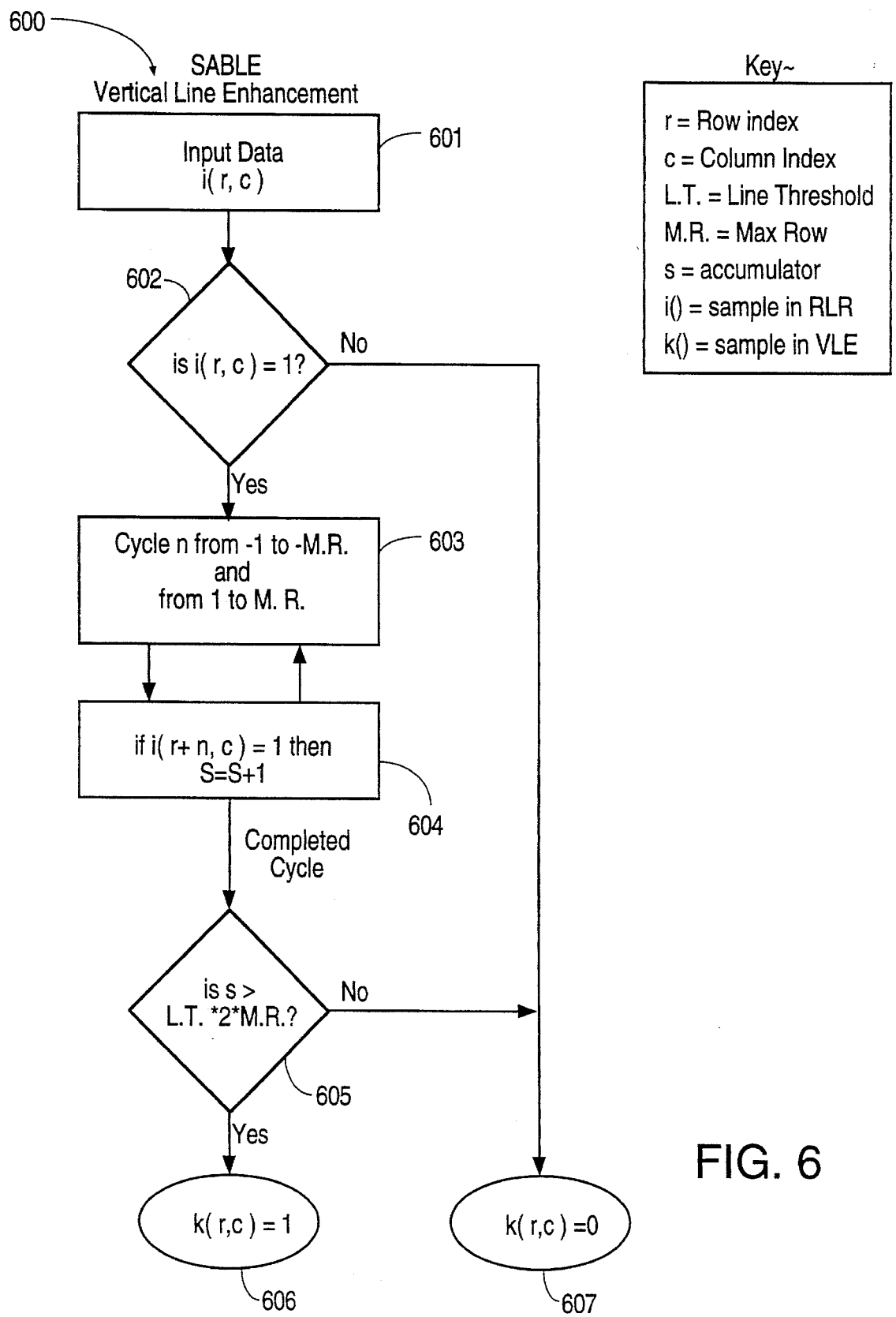
FIG. 6 shows a procedure 600 for deriving a VLE matrix from a RLR matrix, in accordance with the present invention.

FIG. 6 is a flow chart 600 of a procedure to create a VLE matrix from an RLR matrix. In step 601, an element in an RLR matrix is selected. At step 602, the selected element is examined to determine if its value is a '1'. If the selected element is not a '1', the corresponding element in the VLE is '0' (step 607). Otherwise, steps 603 and 604 iterate over the number of rows, which is specified by the max row parameter, above and below the selected element to accumulate the number of '1's above and below the selected element. At step 605, the accumulated number of '1's is compared against the product of the value of the line threshold parameter and twice the value of the max row parameter (i.e. the threshold number of '1's). If the accumulated number of '1's exceeds this product, the element in the VLE matrix corresponding to the selected element in the RLR matrix is set to '1'. Otherwise, the corresponding element in the VLE matrix is set to '0'.

In the present invention, an improvement over the VLE matrix in the detection of a periodic signal is achieved by a "sloped line enhanced" (SLE) matrix. An SLE matrix, which has the same dimensions as an RLR matrix, can be derived from an RLR matrix. The function of the SLE matrix is to detect a vertical straight line, a sloping line or a vertical staggered line in the RLR matrix. While detection of a periodic signal in a VLE matrix requires that the framing frequency is both correctly determined and an integer multiple of the frequency resolution, the SLE matrix accommodates the conditions under which the periodic signal creates a staggered line or a sloping line of '1's in the RLR matrix. A sloping line in the SLE matrix results when the frame rate is not correct to within the resolution of one frequency bin. A staggered line results when the framing frequency is not an integer multiple of the frequency resolution.

Figure 7:
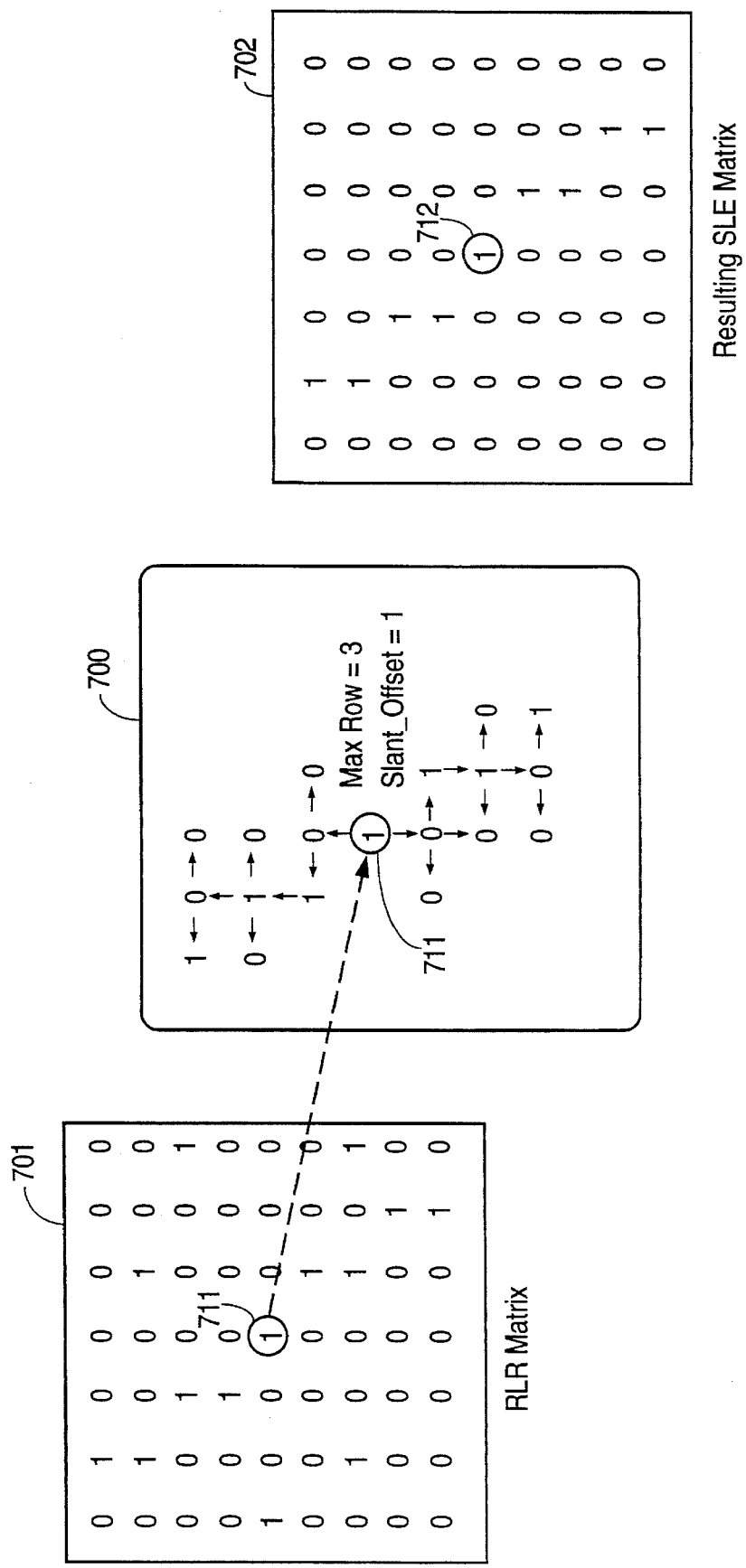
FIG. 7 illustrates the process of deriving an element of an SLE matrix 702, by tracing, beginning at element 711 of RLR matrix 701, the elements proximate to element 711 of RLR matrix 701, in accordance with the present invention.

FIG. 7 illustrates the process of deriving an element of an SLE matrix 702, by tracing, beginning at element 711 of RLR matrix 701, the elements proximate to element 711 of RLR matrix 701. Each element of an SLE matrix is derived by examining, if the corresponding element in RLR matrix 701 has a value of '1', the number of '1's in a selected group of samples in rows above and below this corresponding element. If the number of 1's in this selected group of samples exceeds the product of the value of the line threshold parameter and twice the value of the max row parameter, the element in SLE matrix 702 is assigned the value '1'. Otherwise, the element in SLE matrix 702 is assigned the value '0'.

The group of samples used in deriving each element of SLE matrix 702 is selected by tracing a straight, sloping or staggered line, if any, from the element in RLR matrix 701. Thus, a meandering series of '1's in SLE matrix 701 indicates a sloping or staggered line is detected. A staggered (i.e. meandering) line can be detected because the slope can vary within a controllable width. A "slant offset" parameter is provided to include lines which curve or meander within a number of columns represented by this slant offset parameter. Block 700 shows the path traced in RLR matrix 701 to provide element 712 of SLE matrix 702, according to the present invention, using 3 and 1 respectively as the values of the max row parameter and the slant offset parameter.

The following procedure creates an element j(r,c) of SLE matrix 702, where r and c are respectively the row and the column indices of element j(r,c), by tracing the selected group of samples associated with corresponding element i(r,c) of RLR matrix 701:

if i(r,c)='0', then j(r,c)←'0'; otherwise, if i(r,c)='1', perform the following steps:

(A) initialize the accumulator variable s, the row increment variable n, and the column increment variable m each to '0', and initialize the current column variable c' to c;

(B) cycle row increment variable n between MR and −MR, except 0, where MR is the value of the max row parameter, to repeat the step:

(i) cycle column increment variable m between SO and −SO, where SO is the value of the slant offset parameter, to repeat the following steps:

(a) if i(r+n, c'+m)='0' then return to step (i) for next value of m; otherwise, if i(r+n, c'+m)='1', (b) s←s+1, c'←c'+m and return to (B) for next value of n;

and (C) if s>2*LT*MR, where LT is the value of the line threshold parameter, then j(r,c)←'1'; else, i.e. s≦2*LT*MR, then j(r,c)←'0'.

Figure 8:
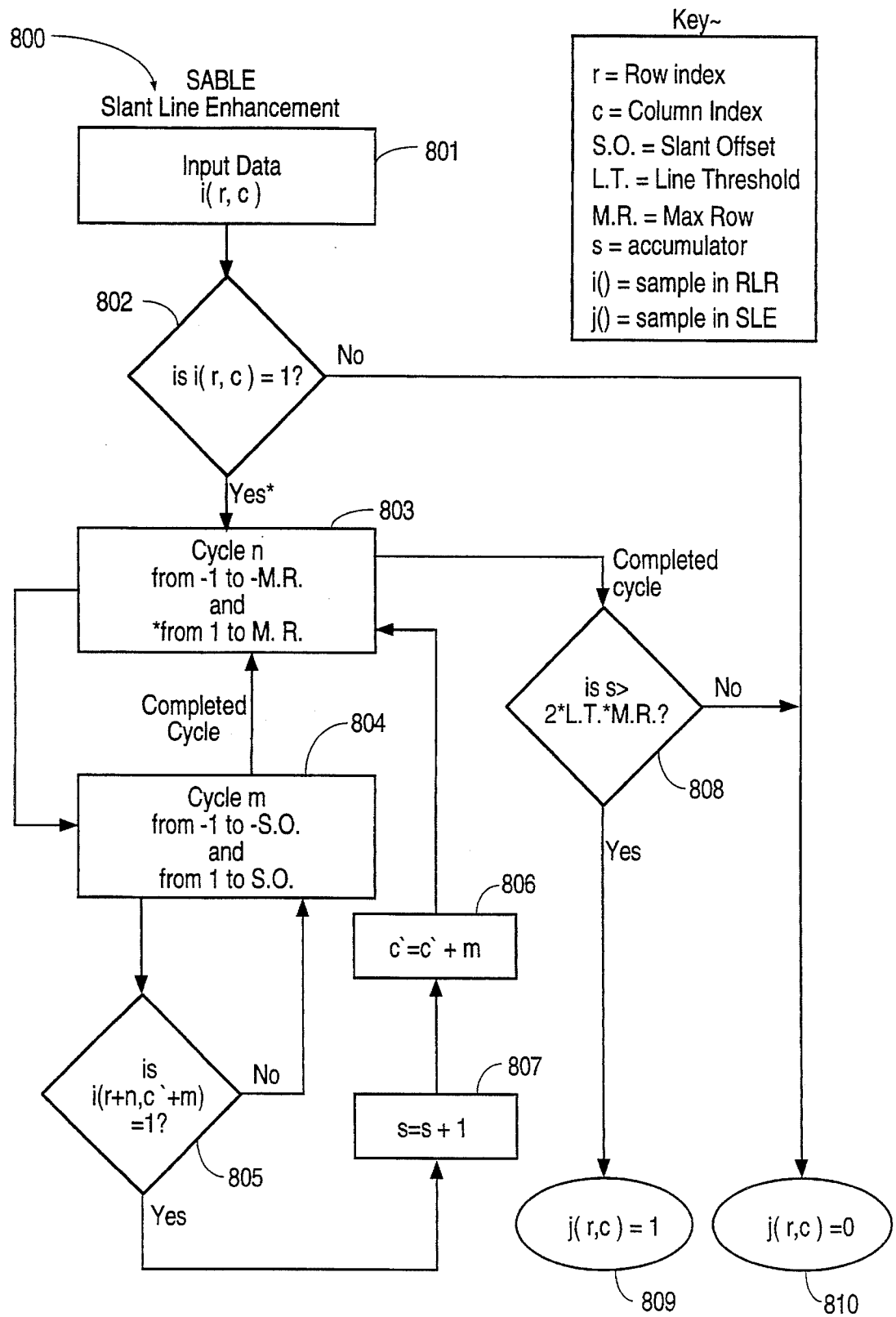
FIG. 8 is a flow chart 800 of the procedure for generating an SLE matrix from a RLR matrix, including instances in which the slant offset parameter has a value other than one.

FIG. 8 is a flow chart 800 of the procedure discussed above. At step 801, an element i(r,c) is selected from the RLR matrix, where r and c are the row and column indices of element i(r,c). At step 802, the selected element is examined if it has a value of '1'. If the selected element has a value of '0', the corresponding element in the SLE matrix is set to '0'. Otherwise, an outer loop 803, which includes an inner loop 804, is entered. Outer loop 803 is indexed by a variable n, which takes values between −MR and MR, except 0. (MR, as defined above, is the value of the max row parameter).

Upon entering outer loop 803, a line length variable ("accumulated sum") s is initialized to 0, and a current column variable c' is initialized to c. Inner loop 804, consisting of steps 805, 806 and 807, is indexed by a variable m running between −SO and SO. (SO, as defined above, is the value of the slant offset parameter). Inner loop 804 searches for a '1' value by iterating through the elements in a row of the RLR matrix within the number of elements specified by the value of the slant offset parameter. After having found the first '1' value within inner loop 804, the accumulated sum s is incremented, and the current column variable c' is set to the column position of the '1' value found. Outer loop 803 cycles through the remaining rows within the number of rows specified by the value of the max row parameter (steps 803 and 806), to continue its search for the next '1' value.

When outer loop 803 is completed (step 808), the accumulated sum s is compared with the product of the value of the line threshold parameter and twice the value of the max row parameter. If the accumulated sum s exceeds this product, the element in the SLE matrix corresponding to the selected element is set to '1' (step 809). Otherwise, the element in the SLE matrix corresponding to the selected element is set to '0'.

Parameter values used in creating the PSB spectrum, the VLE matrix or the SLE matrix can be automatically and adaptively updated for automatic monitoring of signal detection. The updating of parameter values is automatically controlled by an iterative feedback process. The general approach to updating parameter values consists of: (i) updating the value of a single parameter at a time, (ii) creating the PSB spectrum and the VLE matrix or the SLE matrix, using the updated value of the selected parameter, and (iii) evaluating the impact on the resulting VLE or SLE matrix. The impact of an updated parameter value on a VLE or SLE matrix can be evaluated using performance parameters. If the values of the performance parameters suggest that signal detection performance is degraded in the updated SLE or VLE matrix, the updated parameter value is reset to the previous value. The updating process then moves on to update another parameter.

In this embodiment, performance parameters "column mean" and "line length" are computed. The column mean is the average number of 1's per column in the line enhanced matrix, and is obtained by dividing the number of 1's in the VLE or SLE matrix by the number of columns in the SLE or VLE matrix.

The line length performance parameter measures the length of a vertical or a sloping line detected in a VLE or an SLE matrix. The line length performance parameter allows confirmation of a signal detection. Line length is measured by summing the samples along a vertical or a sloping line. The procedure described above for detecting a vertical or a sloping line in an RLR matrix can be modified to compute the value of the line length performance parameter in the SLE or VLE matrix. The line length can be computed by accumulating the number of '1's, as one scans down from each sample having a value of '1'. Such a scan finds not only vertical lines, but also lines that meander over one or more adjacent columns.

Figures 9A, 9B:
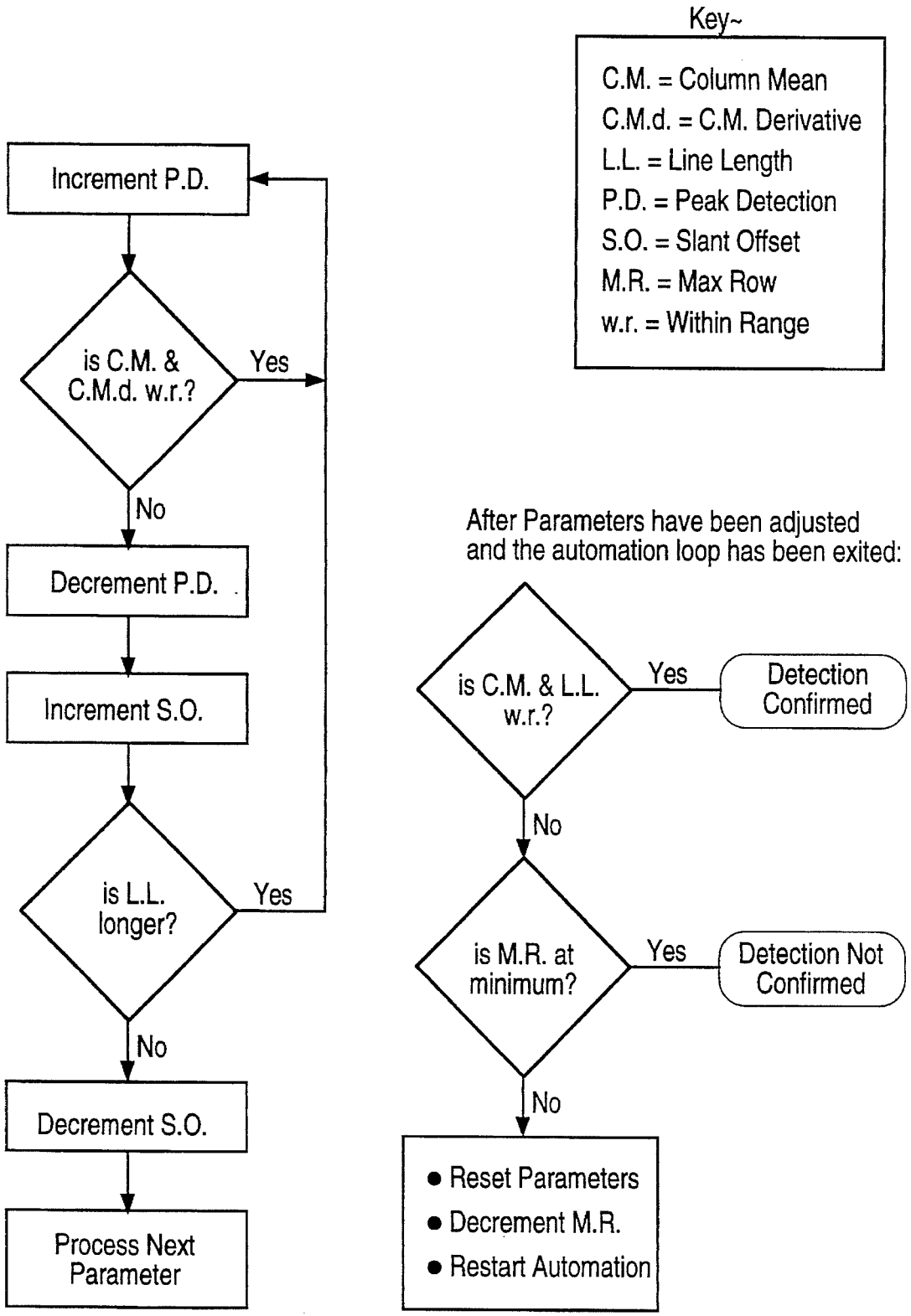

The following procedure, which is graphically shown in FIG. 9a, is applied to update the parameters discussed above, using the line length and column mean parameters:

1. (a) increment the peak detection parameter; and
   (b) if the values of the column mean performance parameter and its derivative[1] in the resulting VLE or SLE matrix are within predetermined ranges of values, then
   (i) repeat (a); otherwise, (ii) decrement the peak detection parameter.

[1] The derivative of the column mean performance parameter is the difference between the current column mean performance parameter and the previous column mean performance parameter.

2. (a) increment the slant offset parameter; and
   (b) if the value of the line length performance parameter increases, then
   (i) repeat the procedure from step 1; otherwise, (ii)

decrement slant offset parameter.

After the parameters are updated according to the procedure described above, the final values of the performance parameters can be used to determine if a signal is detected. The following procedure, which is shown graphically in FIG. 9b, can be used:

If the final values of the performance parameters column mean and line length are within a set of specified ranges, then (a) report that a signal is detected; otherwise,
(b) if the max row parameter is at a predetermined minimum, then (i) report that no signal is detected; else
(ii) (1) decrement the max row parameter;
(2) reset all parameters to a set of initial values; and
(3) redo the parameter update procedure.

Thus, the present invention provides a set of procedures which can be implemented in one or more computer systems to continually and adaptively monitor signal detection without human intervention.

Figure 10A:
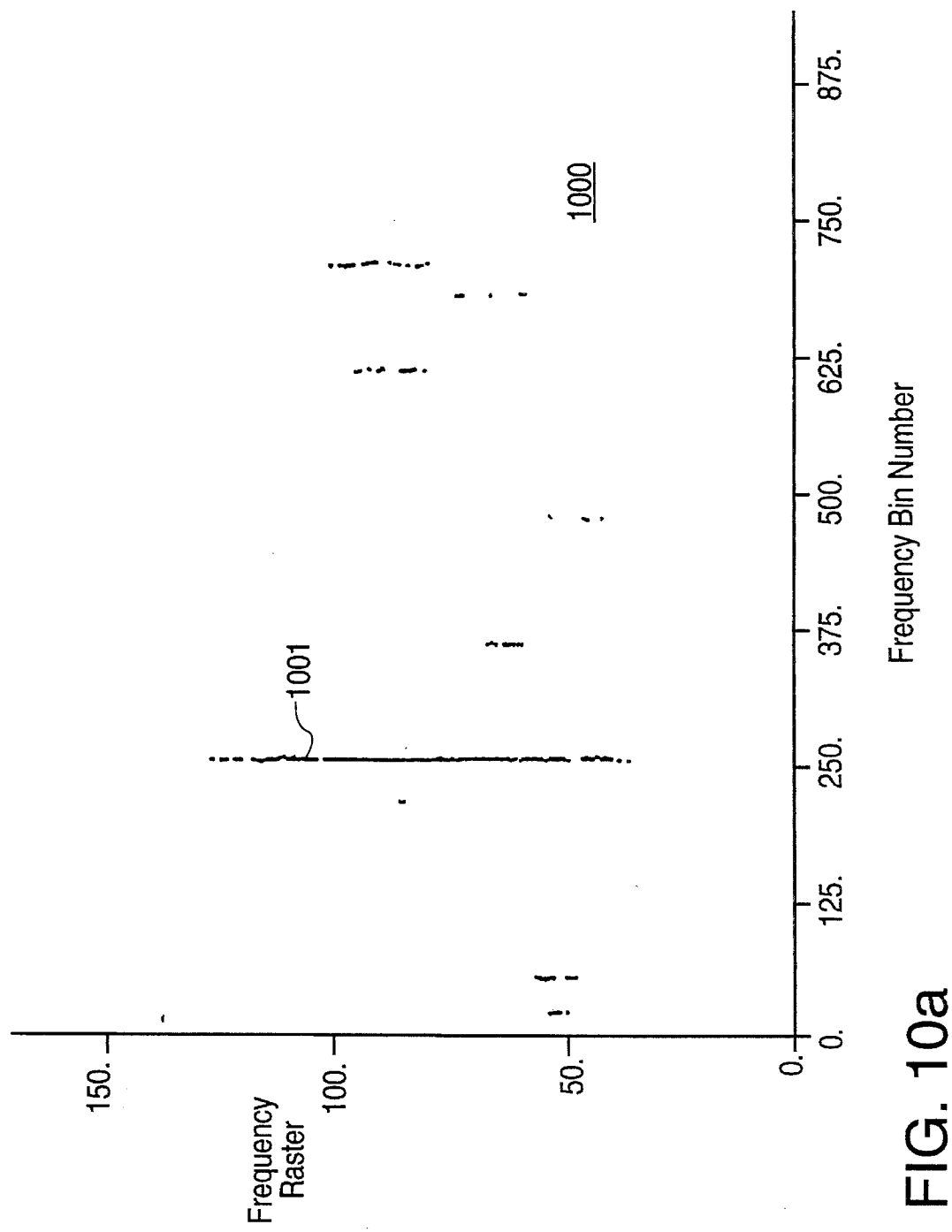
FIG. 10a is an example of a line enhanced matrix 1000, in which the line 1001 indicates existence of a periodic signal at the framing rate of the input data.

FIG. 10a is an example of a line enhanced matrix 1000, in which the line 1001 indicates existence of a periodic signal at the framing frequency (4 KHz) for which the SABLE processor was configured. Line enhanced matrix 1000 results from processing the RLR matrix 400 of FIG. 4. The extents of line 1001, i.e. the y-coordinates values at the beginning and end of the line 1001, can be used to calculate the lower and upper frequency limits of periodicity in the signal spectrum.

Figure 10B:
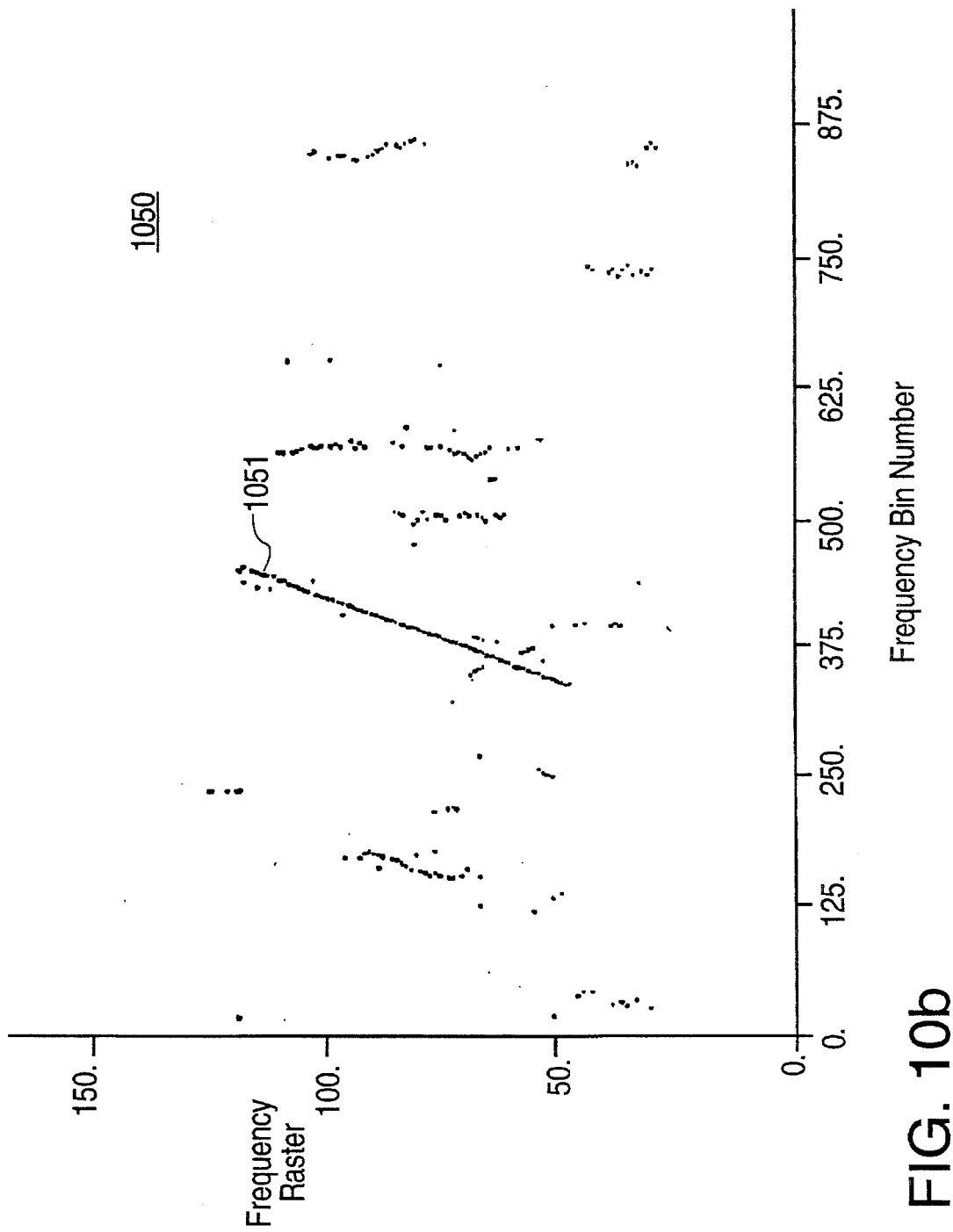
FIG. 10b is an example of a line enhanced matrix 1050, in which a sloped line 1051 indicates that the frame rate is not correctly set.

FIG. 10b is an example of an line enhanced matrix 1050, in which a sloped line 1051 indicates that the frame rate is not correctly set.

The above detailed description is provided to illustrate the specific embodiments of the present invention and is not intended to be limiting the present invention. Numerous modifications and variations are possible within the scope of the present invention. The present invention is defined by the following claims.

I claim:

1. A method for detecting a periodic signal, comprising the steps of:
   creating a detector spectrum from electromagnetic signals received, said detector spectrum comprising a plurality of frequency bins, each frequency bin spanning a predetermined frequency resolution;
   creating a peak selection binary (PSB) spectrum from said detector spectrum by assigning each frequency bin in said PSB spectrum (i) a logic value '1' when, within a predetermined number of frequency bins specified by the value of a peak detection parameter, a sample in a corresponding frequency bin of said detector spectrum is greater in magnitude than samples of neighboring frequency bins in said detector spectrum, and (ii) a logic value '0', otherwise; and
   detecting in said PSB spectrum said periodic signal by examining logic value '1' samples in said PSB spectrum.

2. A method as in claim 1, wherein said detecting step comprises the steps of:
   creating a rate line raster (RLR) matrix from said peak selection binary spectrum by rastering said peak selection binary spectrum at a framing frequency interval; and
   detecting in said RLR matrix neighboring logic values of '1's.

3. A method as in claim 2, wherein said step of detecting in said RLR matrix neighboring logic values of '1's comprises the step of creating a line enhanced matrix having a logic value of '1' at each element where, at a corresponding element in said RLR matrix, a line of logic values of '1' is detected in said RLR matrix within a predetermined number of rows in said RLR matrix.

4. A method as in claim 3, wherein said step of creating a line enhanced matrix comprises the step of creating from said RLR matrix a vertical line enhanced (VLE) matrix, said VLE matrix created by assigning, (i) for each element of said VLE matrix, a logic value of '1', when a corresponding element in said RLR matrix has a value of '1' and, within said predetermined number of rows in said RLR matrix, the number of elements having a logic value of '1' within the same column of said corresponding element exceed a predetermined line threshold, and (ii) a logic '0', otherwise.

5. A method as in claim 3, wherein said step of creating a line enhanced matrix comprises the step of creating from said RLR matrix a sloped line enhanced (SLE) matrix, said SLE matrix created by assigning, (i) for each element of said SLE matrix, a logic value of '1', when a corresponding element in said RLR matrix has a value of '1' and, within said predetermined number of rows in said RLR matrix, the number of elements (a) having a logic value of '1' and (b) within a predetermined slant offset distance from a '1' value in an adjacent row exceed a predetermined line threshold, and (ii) a logic '0', otherwise.

6. A method as in claim 4, wherein said step of creating a line enhanced matrix comprises, for each element j(r,c) of said line enhanced matrix, r and c being respectively the row and column indices of said element, the steps of:
   if an element in a corresponding element i(r,c) of said RLR matrix equals '0', assigning j(r,c) a value of '0'; otherwise, performing the steps of:
   (A) initializing an accumulator variable s, a row increment variable n, and a column increment variable m each to '0', and initializing the current column variable c' to c;
   (B) cycling said row increment variable n between MR and −MR, except 0, where MR is the value of a max row parameter, to repeat the step of:
      (i) cycling said column increment variable m between SO and −SO, SO being the value of a slant offset parameter, to repeat the step of:
         if an element i(r+n, c'+m) in said RLR matrix equals '0', returning to step (i) for a next value of said column increment variable m; otherwise, (a) incrementing said accumulator variable s, (b) adding to said current column variable c' the value of said column increment value m and (c) returning to (B) for next value of said row increment variable n; and
   (C) if s>2*LT*MR, LT being the value of a line threshold parameter, assigning said element j(r,c) a value of '1'; else, assigning said element j(r,c) a value of '0'.

7. A method as in claim 3, further comprising the step of adaptively updating values of parameters using (i) a parameter "column mean" being the average number per column of logic value '1's in said line enhanced matrix, and (ii) a parameter "line length", being the length of a selected line in said line enhanced matrix.

8. A method as in claim 6, further comprising a step of adaptively updating parameters of said method using the values of (i) a column mean parameter, being the average number per column of logic value '1's in said line enhanced matrix, and (ii) a line length parameter, being the length of a selected line in said line enhanced matrix, said step of adaptively updating parameters comprising the step of iterating, until the value of said line length parameter is no longer increasing, the steps of:

(a) iterating, while the value of said column mean parameter is within predetermined limits, the steps of:
  (i) incrementing the value of said peak detection parameter;
  (ii) creating said line enhanced matrix; and
  (iii) computing the values of said column mean and said line length parameters; and
(b) incrementing said slant offset parameter.

9. A method as in claim 8, further comprising, after said step of adaptively updating parameters, the steps of:

(1) reporting, when the values of said column mean and line length parameters are within a set of specified ranges, detection of a signal; and (2) when the value of either of said column mean and line length parameters is outside the corresponding range in said set of specified ranges, and (i) when the value of said max row parameter is at a predetermined minimum, reporting absence of detection of a signal; otherwise, (ii) when said max row parameter is not at said predetermined minimum, performing the steps of:
  (a) decrementing the value of said max row parameter;
  (b) resetting the values of said peak detection parameter and said slant offset parameter to a set of initial values; and
  (c) repeating said step of adaptively updating parameters.

* * * * *